United States Patent
Hegner et al.

(10) Patent No.: US 7,249,515 B2
(45) Date of Patent: Jul. 31, 2007

(54) CAPACITIVE PRESSURE SENSOR

(75) Inventors: Frank Hegner, Lörrach (DE); Igor Getman, Lörrach (DE); Ulfert Drewes, Müllheim (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 10/528,094

(22) PCT Filed: Sep. 9, 2003

(86) PCT No.: PCT/EP03/10009

§ 371 (c)(1),
(2), (4) Date: Mar. 13, 2006

(87) PCT Pub. No.: WO2004/031716

PCT Pub. Date: Apr. 15, 2004

(65) Prior Publication Data

US 2006/0185435 A1  Aug. 24, 2006

(30) Foreign Application Priority Data

Sep. 16, 2002 (DE) .............................. 102 43 079

(51) Int. Cl.
*G01L 19/04* (2006.01)
(52) U.S. Cl. .................. 73/708; 73/724; 361/283.1
(58) Field of Classification Search ......... 73/700–756; 361/283.1
See application file for complete search history.

(56) References Cited

U.S. PATENT DOCUMENTS 5,925,824 A * 7/1999 Soma et al. .................. 73/718
6,675,655 B2 * 1/2004 Broden et al. ............... 73/716
6,828,801 B1 * 12/2004 Burdick et al. ............. 324/658
7,119,551 B2 * 10/2006 Burdick ....................... 324/658

* cited by examiner

*Primary Examiner*—Edward Lefkowitz
*Assistant Examiner*—Jermaine Jenkins
(74) *Attorney, Agent, or Firm*—Bacon & Thomas, PLLC

(57) ABSTRACT

For minimizing the span error of a pressure sensor having an essentially cylindrical platform and a measuring membrane joined to an end face of the platform, with the pressure measuring cell being axially clamped between an elastic sealing ring, which bears against the membrane-bearing end face of the pressure measuring cell, and a support ring, which bears against the rear face of the pressure measuring cell, the dimensions of the support ring are coordinated with the dimensions of the sealing ring and pressure measuring cell such that a radial deformation of the membrane-bearing end face caused by the axial clamping of the pressure measuring cell is sufficiently small that the span error of the pressure sensor arising from a reduction of the axial clamping force by at least 10% amounts to not more than about 0.02%. Additionally, arranged between the support ring and a clamping ring is a stiff decoupling element, which minimizes the temperature hysteresis of the span. The geometry of the support ring and the decoupling element is determined iteratively by means of FEM.

15 Claims, 3 Drawing Sheets

CAPACITIVE PRESSURE SENSOR

FIELD OF THE INVENTION

The invention relates to a capacitive pressure sensor, especially a capacitive, ceramic pressure sensor.

BACKGROUND OF THE INVENTION

Such pressure sensors are used time and again in process measurement technology for measuring the pressure of process media in liquid, gas or vapor form. Essentially, such pressure sensors include a pressure measurement cell composed of a platform and an elastic membrane, or diaphragm, especially a ceramic platform and a ceramic membrane. The platform has a shallow cavity, which is called the membrane bed and which is spanned by the membrane. During measurement operation, the membrane is loaded with the pressure of a pressurized medium, and the deformation of the elastic membrane, determined capacitively or resistively, is a measure of the pressure. Such a pressure measurement cell is disclosed, for instance, in the German Offenlegungsschrift DE 39 01 492.

During measurement operation, a pressure measurement cell is usually axially clamped between an elastic seal, which is on the media side, bearing against the end of the sensor carrying the membrane, and a support ring, which axially supports the side of the platform facing away from the membrane, such as is shown, for example, in the German Offenlegungsschrift DE 42 13 857.

In so far as the deformation of the membrane at given pressure depends on the effective membrane stiffness, it is necessary to keep the membrane stiffness as constant as possible over the measuring range of the pressure sensor, following the calibration. It is, therefore, especially important that as few radial forces as possible act on the pressure measurement cell, since radially inwardly acting forces can decrease membrane stiffness and radially outwardly acting forces can increase membrane stiffness.

In the likewise pending, German patent application of file number 10229703.7, the assignee discloses that the axial clamping of a pressure measurement cell between a sealing ring and a support ring effects an elastic flexure of the rear surface of the platform in the axial direction. The flexure leads to radial deformations of the platform in the region of the membrane-bearing end surface, if the geometry of the support ring is not properly coordinated with the geometry of the pressure measurement cell. Here, the inner diameter of the support ring proves to be an especially critical variable. If the bearing surface of the support ring is too large, i.e. the inner diameter is too small, then the axial clamping forces, which are introduced into the pressure measurement cell, or the platform thereof, by the sealing ring at such diameter, cause bending moments in the pressure measurement cell, which result, in sum, to a radially outwardly directed deformation of the measuring membrane. In similar manner, the end surface facing the sealing ring is deformed elastically radially inwards, when the bearing surface of the support ring is too small, i.e. the inner diameter of the support ring is too large.

The described, end-surface, radial deformations could be accepted, if they could be kept constant. This is, however, not practical, since the radial deformations are a function of the axial clamping forces, which, in turn, depend particularly on the aging, or tempering, of the elastic sealing ring, via which the axial clamping forces are introduced. By way of example, the axial clamping force can be irreversibly reduced from 500 N to about 400 N, when a pressure sensor with a newly installed sealing ring is heated to 80° C.

Changes of the radial deformation are, from a practical point of view, therefore only preventable by a design wherein, even at maximum axial clamping force, no appreciable radial deformations occur.

The solution of the named German patent application with the file no. 10229703.7 therefore uses the approach of identifying, for a pressure measurement cell of predetermined dimensions and material properties, an inner diameter of the support ring for which the radial deformation of the pressure measurement cell in the region of the bond joints of the measuring membrane is largely eliminated, so that the variation of membrane stiffness because of the changing axial clamping forces is reduced to an acceptable residual error.

The pressure sensor of 10229703.7 includes a pressure measurement cell having an essentially cylindrical platform with a first diameter and a first thickness, a measuring membrane of a second diameter and a second thickness bonded on an end face of the platform, with the pressure measurement cell being axially clamped between an elastic sealing ring of a third diameter and a third thickness, lying against the membrane-bearing end face of the pressure measuring cell, and a support ring of a fourth outer diameter, a fourth inner diameter and a fourth thickness, with the support ring bearing against the rear face of the pressure measurement cell facing away from the measuring membrane; wherein, further, the dimensions of the support ring are matched to the dimensions of the sealing ring and the pressure measurement cell such that a radial deformation of the membrane-bearing end face resulting from the axial clamping of the pressure measurement cell is so small that the span error of the pressure sensor arising from a reduction of the axial clamping force by at least 10% amounts to not more that about 0.02% of the span.

The span error refers, in this connection, to the deviation of the difference arising in the case of reduced axial clamping force between the measured value at maximum pressure and the measured value in the absence of pressure loading from the corresponding difference at full axial clamping force.

The full axial clamping force refers, for example, to the axial clamping force used for sensors with new sealing rings, such that, after tempering, or aging, of the sealing ring, the specification pressure can still be held safely. The axial clamping force can lie, for example, between 350 N and 550 N, with the selected clamping force for a specific case depending on the type of seal and the rated pressure, i.e. the specifications, of the pressure sensor.

More recent experimental investigations have now shown that variants, in which the support ring is securely connected to the platform or is constructed integrally therewith, are more manageable with respect to span error. I.e., the span error assumes some small value and scarcely varies between various measurement cells of a type.

The results regarding the temperature hysteresis of the span are, however, unsatisfactory for these variants, i.e. the span error resulting from hysteresis is too large.

As presently understood, temperature hysteresis is a result of insufficient relaxation at the interfaces between components with different coefficients of thermal expansion. Especially critical in this regard is the interface between a threaded ring, the clamping ring, for the clamping of the support ring.

SUMMARY OF THE INVENTION

It is, therefore, an object of the present invention to provide a pressure sensor, wherein both the span error based on the change of the axial clamping and the temperature hysteresis are reduced.

The object is achieved according to the invention which is embodied as a including:

a pressure measurement cell having an essentially cylindrical platform of a first diameter and a first thickness, and a measuring membrane of a second diameter and a second thickness joined to an end face of the platform, an elastic sealing ring of a third diameter and a third thickness, a support ring of a fourth outer diameter, a fourth inner diameter and a fourth thickness, with the support ring being securely connected with the end face of the pressure measurement cell facing away from the measuring membrane, a clamping ring having a first engagement means, and a housing for accommodating a pressure measurement cell, with the housing having an axial bearing surface for the seal and second engagement means, which engages with the first engagement means, with the pressure measurement cell being axially clamped by means of the clamping ring between the elastic sealing ring, which is arranged between the axial bearing surface of the housing and the membrane-bearing end face of the pressure measurement cell, and the support ring, wherein, additionally, a stiff decoupling element is arranged between the clamping ring and the support ring, and the dimensions of the support ring and, if necessary, the decoupling element are coordinated with the dimensions of the sealing ring and the pressure measurement cell such that a radial deformation of the membrane-bearing end face caused by the axial clamping of the pressure measurement cell is so small, that the span error of the pressure sensor on the basis of a reduction of the axial clamping force by at least 10% amounts to not more than about 0.02% and the temperature hysteresis of the span amounts to not more than about 0.03%.

The temperature hysteresis can, for example, be determined before and after a temperature cycle, in which the sensor is warmed from room temperature to 150° C., then cooled to −40° C., and finally warmed back to room temperature. Equally as well, there can first be a cooling to the minimum temperature, before the warming to the maximum temperature.

Preferably, the dimensions of the support ring and, if necessary, the decoupling element are optimized such that the span error in the case of a reduction of the clamping force by at least 20% amounts to not more than about 0.02%. More preferably, the dimensions of the support ring and, if necessary, the decoupling element are optimized such that the span error in the case of a reduction of the clamping force by at least 10%, or even by at least 20%, amounts to not more than about 0.01%.

Furthermore, the dimensions of the support ring and, if necessary, the decoupling element can be optimized such that the temperature hysteresis of the span amounts to not more than 0.02% and especially preferably not more than 0.01%.

Preferably, the platform and the measuring membrane are made of the same material, with a ceramic material being currently preferred, especially corundum. The measuring membrane preferably has about the same diameter as the platform. Especially in the case of ceramic pressure sensors, the measuring membrane can be secured to the end face of the platform by means of an active braze or a glass. In a further preferred form of embodiment, the bond comprises a sintered corundum.

The support ring exhibits in the currently preferred form of embodiment likewise the same material as the platform. This is advantageous in that the support ring then has the same coefficient of thermal expansion as the platform. The support ring should preferably be of a material at least as stiff as that of the platform. The outer diameter of the support ring should not be smaller than, and preferably is the same as, the diameter of the platform. In a currently preferred form of embodiment, the support ring is connected permanently with the platform. This can be done by soldering, preferably by means of an active braze, or by adhesive. Finally, the support ring and the platform can be manufactured as one piece. The support ring has preferably at least the thickness of the platform.

The decoupling element is stiff such that the material of the decoupling element has mechanical properties which are comparable with those of the material of the support ring.

The decoupling element serves especially to minimize deformations of the support ring because of different coefficients of thermal expansion of the clamping ring, the housing and the support ring.

Presently, two variants of decoupling element are preferred:

In the case of the first variant, the decoupling element comprises a decoupling ring, which preferably has the same inner and outer diameters as the support ring. More preferably, the decoupling ring has about the same thickness as the support ring. The surface of the decoupling ring bears against the surface of the support ring. Optionally, means are provided for minimizing friction between the decoupling ring and the support ring. For this purpose, a plastics layer, or foil, for instance Teflon, a layer of hard, smooth material such as DLC (Diamond Like Carbon), or a lubricant, such as molybdenum disulfide, can be used.

In the case of the second variant, the decoupling element comprises a stiffening plate. The stiffening plate can lie loose against the support ring, be connected to the support ring, or the support ring and stiffening plate can be one piece. With regard to reducing temperature hysteresis, the connection of the stiffening plate is currently thought not to have an influence. Preferably, the stiffening plate has the same diameter as the outer diameter of the support ring. Particularly the thickness of the stiffening plate is a parameter which can be varied in optimizing the sensor of the invention.

The clamping ring comprises preferably a threaded ring, with the first engagement means being realized by the thread on the lateral surface of the threaded ring. The second engagement means is correspondingly an internal thread in a cylindrical housing section, into which the threaded ring engages, in order to exert via the decoupling element and the support ring an axial clamping force on the pressure measurement cell.

BRIEF DESCRIPTION OF THE DRAWING

The invention will now be explained in greater detail on the basis of an example of an embodiment illustrated in the accompanying figures, which show as follows.

DESCRIPTION OF THE PREFERRED EMBODIMENTS

Figure 1:
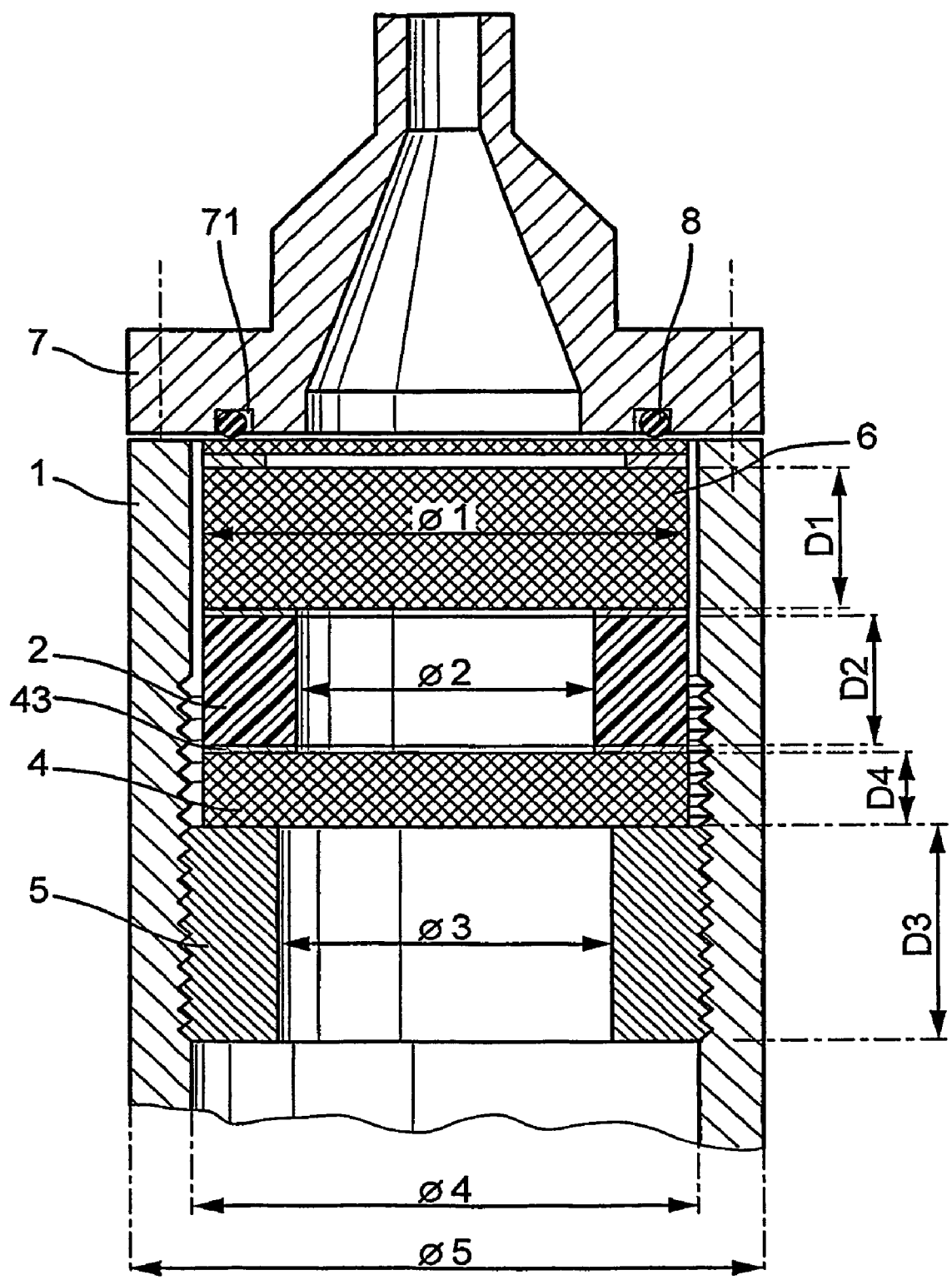
FIG. 1 sectional view of a pressure sensor of the invention.

The pressure sensor shown in FIG. 1 includes a pressure measurement cell 6 composed of a platform and a measuring membrane of corundum. The measuring membrane is secured on the front face of the platform by means of an active braze. A support ring of corundum, whose outer diameter is equal to the diameter Ø1 of the platform, is secured on the rear face of the platform by means of an active braze. The pressure measurement cell 6 and the support ring 2 are arranged in a housing of stainless steel. The housing has a cylindrical measurement cell chamber 1 and a process connection flange 7. Flange 7 is arranged at an opening on an end of the measurement cell chamber 1. The process connection flange 7 extends radially inwards from the cylindrical wall of the measurement cell chamber 1 and thus forms an axial bearing surface in which an annular groove 71 is formed for receiving an elastic sealing ring 8. The pressure measuring cell 6 presses with its membrane-bearing end face axially against the sealing ring 8.

The clamping force is determined by the compression of the sealing ring 8 and its elastic properties. The compression of the sealing ring is set at the time of assembly of the pressure sensor via the position of a threaded ring 5, which acts from the rear via a decoupling element, here a decoupling plate 4, on the support ring 2. The elastic properties of the sealing ring 8 change due to aging, or tempering, of the sealing ring under compression. In the case of the described example of an embodiment, the beginning clamping force amounts to 500 N. Following a tempering of the sealing ring, which can happen during use, for example due to cleaning cycles of the sensor with steam, the clamping force sinks to 400 N.

Figure 2A:
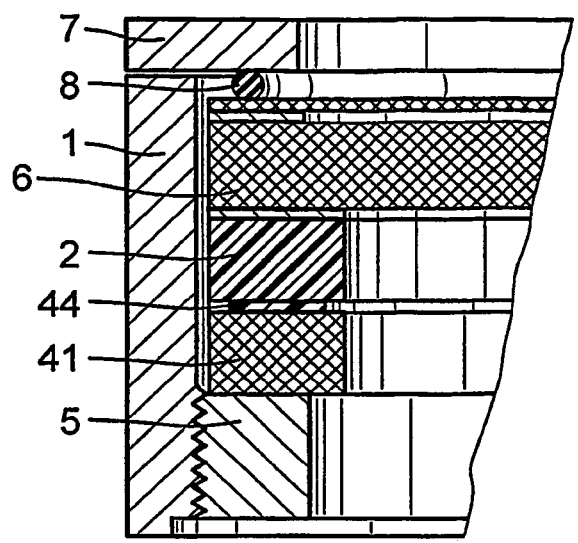
FIGS. 2a–c schematic views of different variants of the decoupling element of the pressure sensor of the invention.
Figure 2B:
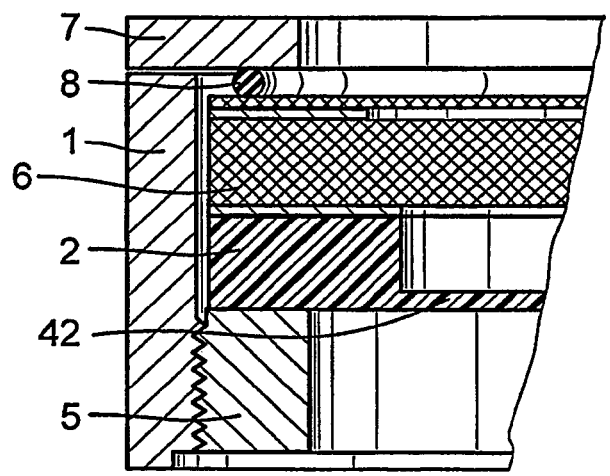
Figure 2C:
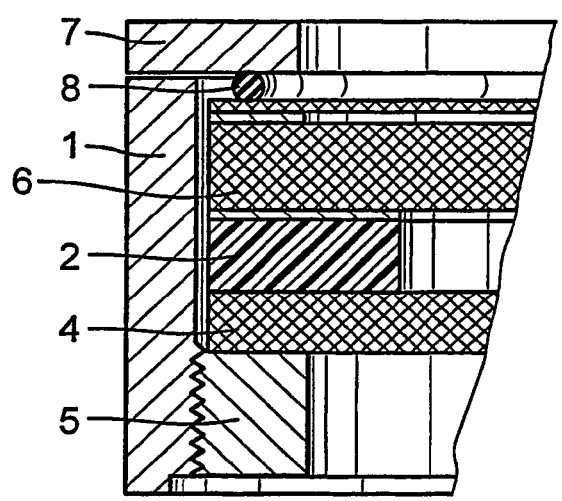

Examples of clamping elements are shown in the detail views of FIGS. 2a–c.

In FIG. 2a, a decoupling ring 41 is installed as decoupling element. A Teflon layer is arranged between the decoupling ring 41 and the support ring 2. The temperature hysteresis of the span was reduced from 0.15% to about 0.01% by insertion of the support ring 2.

FIGS. 2b and 2c show a variant in which the decoupling element is realized as a stiff decoupling plate. In FIG. 2b, the decoupling plate 42 and the support ring 2 are formed as one piece. In FIG. 2c, a decoupling plate 4 is loose against the support ring. With regard to reducing the span error and the temperature hysteresis of the span error, the type of connection 43 of the decoupling plate with the support ring plays no role, i.e. the hysteresis can be significantly reduced by the support ring and decoupling plate as one piece, by loose decoupling plates or by decoupling plates secured to the support ring by means of brazing.

Using a decoupling plate thickness of one-tenth of the support ring thickness, the temperature hysteresis of the span was reduced from 0.15% to 0.03%, while, with a decoupling plate of the same thickness as the support ring, the temperature hysteresis of the span was reduced to 0.01%. The span error in the case of a variation of the axial clamping forces by 20% amounted, at the same time, to 0.02%.

The identification of the optimum inner diameter Ø2 of the support ring will now be explained for an example of an embodiment. The predetermined dimensions were: Platform diameter Ø1=32.4 mm, thickness of the platform T1=5 mm, thickness of the membrane 160 µm, thickness of the active braze layer 55 µm.

By means of FEM, first the deformation of the pressure measurement cell was determined for various inner diameters of the support ring in the case of axial clamping forces of 500N and 400N, and the span resulting therefrom in the case of loading with the nominal pressure (170 mbar for the pressure measurement cell which was used) was likewise calculated with FEM. The span error is found by comparison of the spans at 500 N clamping force and 400 N clamping force. For reducing the computing time, the support ring was first assumed to be infinitely stiff.

Figure 3A:
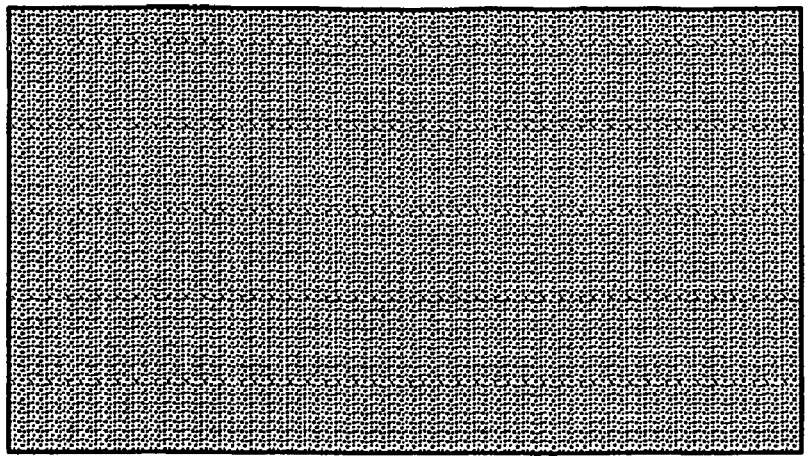
FIGS. 3a–c FEM data on the deformation of a pressure measurement cell under axial clamping.
Figure 3B:
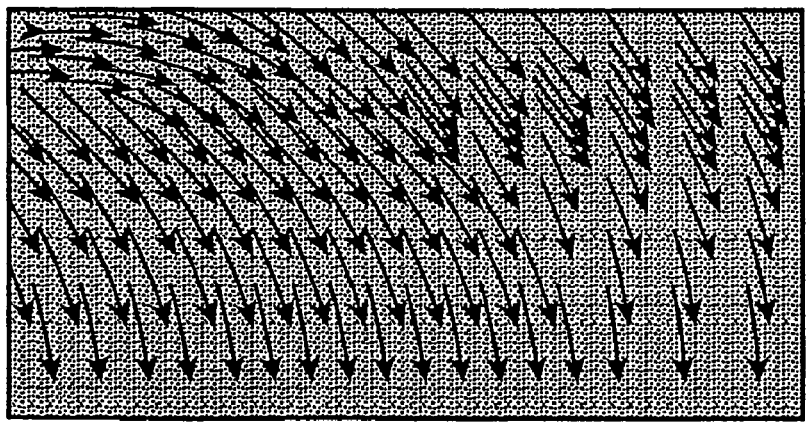
Figure 3C:
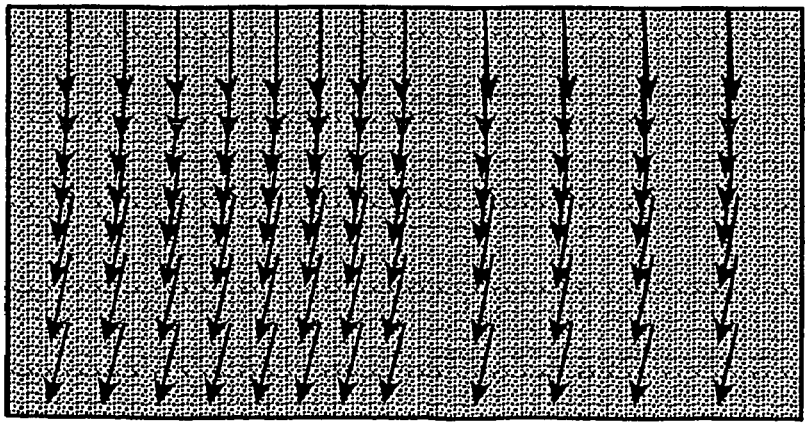

FIGS. 3a–c show vector representations of the deformation of the pressure measurement cell due to the axial clamping for a section around the inner edge of the joint between the platform and the measuring membrane for different inner diameters Ø2 of the support ring.

In FIG. 3a, the inner diameter is 27.8 mm. This inner diameter is too large. The illustrated vector field at a clamping force of 500 N shows a radially inwardly directed displacement, which reduces the membrane stiffness. The span in such circumstance thus becomes greater. The span change relative to the non-clamped cell amounts to about +0.8%. In the case of a clamping force of 400N, the span change is reduced to about +0.64. Consequently, the span error amounts to −0.16%.

In FIG. 3b, the inner diameter is 10.0 mm. This inner diameter is too small. The illustrated vector field at a clamping force of 500 N shows a radially outwardly directed displacement, which increases the membrane stiffness. The span in such circumstance thus becomes smaller. The span change relative to the non-clamped cell amounts to about −0.1%. In the case of a clamping force of 400N, the span change is reduced to about −0.08%. Consequently, the span error amounts to +0.02%.

In FIG. 3c, the inner diameter is 23.2 mm. This value is almost ideal. The illustrated vector field for a clamping force of 500 N shows scarcely any radial displacement in the region of the membrane joint that might change membrane stiffness. The span change compared with the non-clamped cell amounts to about −0.01%. At a clamping force of 400N, the span change sinks to about −0.008%. Thus, the span error amounts to +0.002%.

Consequently, for the given dimensions of the pressure measurement cell, an inner diameter is found for a support ring that largely eliminates the radial deformation of the pressure measurement cell due to axial clamping forces. In putting this into practice, the support ring preferably has a thickness which is not less than the thickness of the pressure measurement cell, in order to stay true to the assumption of a sufficiently stiff, axial support.

FEM was then used with the previously determined support ring data as starting point to determine the deformation of all components of the pressure sensor for axial clamping forces of 500N and 400N. In this, the same modulus of elasticity, namely that of corundum, was assumed for the decoupling plate, the support ring, the platform and the membrane of the pressure measurement cell. VA-steel was specified for the housing and brass for the clamping ring. The span resulting from the deformation was likewise calculated with FEM for loading with the nominal pressure. The span error was determined, as before, by comparing the spans at 500 N clamping force and 400 N clamping force. A span error of less than 0.02% was determined.

FEM was likewise used to determine the deformation of the components during a temperature cycle (room temperature ->-40° C. ->150° C.), in order to ascertain the temperature hysteresis of the span. By varying the thickness of the decoupling plate, a geometry could be identified, at which the temperature hysteresis of the span lies below a desired limit value of 0.03%. Through further iterations using variations of the support ring geometry and strength at an acceptable value, a further improvement is to be expected.

The invention claimed is:

1. A pressure sensor, comprising:
a pressure measurement cell having an essentially cylindrical platform of a first diameter and a first thickness, and a measuring membrane of a second diameter and a second thickness joined to an end face of said platform;
an elastic sealing ring of a third diameter and a third thickness;
a support ring of a fourth outer diameter, a fourth inner diameter and a fourth thickness, with said support ring being securely connected with the end face of said pressure measurement cell facing away from said measuring membrane;
a clamping ring having a first engagement means;
a stiff decoupling element arranged between said clamping ring and said support ring; and
a housing for accommodating said pressure measurement cell, wherein:
said housing has an axial bearing surface for the seal and second engagement means, which engages with the first engagement means,
said pressure measurement cell is axially clamped between said elastic sealing ring, which is arranged between said axial bearing surface of said housing and the membrane-bearing end face of said pressure measurement cell, and said support ring, by means of said clamping ring, and
the dimensions of said support ring and said decoupling element are coordinated with the dimensions of said sealing ring and said pressure measurement cell such that a radial deformation of the membrane-bearing end face caused by axial clamping of said pressure measurement cell is so small, that the span error of said pressure sensor on the basis of a reduction of the axial clamping force by at least 10% amounts to not more than about 0.02% and the temperature hysteresis of the span amounts to not more than about 0.03%.

2. The pressure sensor as claimed in claim 1, wherein:
the inner diameter of said support ring is selected such that the span error in the case of a reduction of the clamping force by at least 20% amounts to not more than about 0.02%.

3. The pressure sensor as claimed in claim 1, wherein:
the inner diameter of said support ring is selected such that the span error in the case of a reduction of the clamping force by at least 10%, or by at least 20%, amounts to not more than about 0.01%.

4. The pressure sensor as claimed in claim 1, wherein:
the temperature hysteresis of the span amounts to not more than 0.02%, and especially preferably, not more than 0.01%.

5. The pressure sensor as claimed in claim 1, wherein:
said platform and said measuring membrane are made of the same material, especially a ceramic material.

6. The pressure sensor as claimed in claim 1, wherein:
said support ring and/or said decoupling element are made of the same material as the platform.

7. The pressure sensor as claimed in claim 1, wherein:
said support ring has at least the thickness of said platform.

8. The pressure sensor as claimed in claim 1, wherein:
said decoupling element comprises a decoupling plate.

9. The pressure sensor as claimed in claim 8, wherein:
said decoupling plate has a diameter equal to the outer diameter of said support ring.

10. The pressure sensor as claimed in claim 8, wherein:
said decoupling plate is not secured to said support ring.

11. The pressure sensor as claimed in claim 1, wherein:
said decoupling element comprises a decoupling ring.

12. The pressure sensor as claimed in claim 11, wherein:
said decoupling ring has about the same dimensions as said support ring.

13. The pressure sensor as claimed in claim 11, further comprising:
means for minimizing friction provided between said support ring and said decoupling ring.

14. The pressure sensor as claimed in claim 1, wherein:
the coefficient of static friction between said support ring and said decoupling ring amounts to less than 0.2.

15. A method for the iterative optimizing of the dimensions of a support ring and a decoupling element for a pressure sensor which measures the pressure of a process media in liquid, gas or vapor form comprising the steps of:
determining a geometry for the support ring and for the decoupling element;
calculating a first span change of the pressure sensor under a first axial clamping force;
calculating a second span change of the pressure sensor under a second axial clamping force;
determining the span error by comparing the first span change with the second span change;
evaluating the span error;
determining the temperature hysteresis of the span and evaluating the temperature hysteresis of the span, if necessary under the condition that the span error be sufficiently small; and
varying the geometry of the support ring and, if necessary, the decoupling element, and repeating all but the first step, until a suitable geometry is found for a sufficiently small span error and a sufficiently small temperature hysteresis of the span.

* * * * *